United States Patent [19]

Yabuki et al.

[11] Patent Number: 5,304,608
[45] Date of Patent: Apr. 19, 1994

[54] TWO PIECE GOLF BALL

[75] Inventors: Yoshikazu Yabuki; Seiichiro Endo, both of Akashi, Japan

[73] Assignee: Sumitomo Rubber Industries, Ltd., Hyogo, Japan

[21] Appl. No.: 968,675

[22] Filed: Oct. 30, 1992

[30] Foreign Application Priority Data

Nov. 1, 1991 [JP] Japan .................................. 3-287495

[51] Int. Cl.$^5$ .................... C08F 279/02; A63B 37/00; A63B 37/02
[52] U.S. Cl. ...................................... 525/274; 273/62; 273/230
[58] Field of Search .................... 525/274; 273/62, 230

[56] References Cited

U.S. PATENT DOCUMENTS

| | | | |
|---|---|---|---|
| 4,266,772 | 5/1989 | Martin et al. | 260/998.14 |
| 4,858,924 | 8/1989 | Saito et al. | 273/62 |
| 5,019,319 | 5/1991 | Nakamura et al. | 260/998.14 |
| 5,131,662 | 7/1992 | Pollitt | 260/998.14 |

FOREIGN PATENT DOCUMENTS 2127303  4/1984  United Kingdom .

OTHER PUBLICATIONS

Database WPIL, Section Ch, Week 8415, Derwent Publications Ltd., London, GB; Class A, An 84–091534 & JP-A-59 037 961 (Sumitomo Rubber Industries Ltd.) Mar. 1, 1984, abstract.

*Primary Examiner*—Vasu S. Jagannathan
*Attorney, Agent, or Firm*—Birch, Stewart, Kolasch & Birch

[57] ABSTRACT

The present invention provides a two piece golf ball having excellent hit feeling, which comprises a core and a cover, wherein the core has a deformation (compression deformation) of 3.7 to 4.5 mm caused by applying from 10 kg of an initial load to 130 kg of a final load, and is prepared from a rubber composition comprising 100 parts by weight of a cis-1,4-polybutadiene rubber and 20 to 30% by weight of a metal salt of an unsaturated carboxylic acid, and wherein the cover has a stiffness modulus of 3,700 to 4,500 kg/cm$^2$ and a thickness of 2.2 to 2.9 mm.

4 Claims, No Drawings

TWO PIECE GOLF BALL

FIELD OF THE INVENTION

The present invention relates to a two piece golf ball. Particularly, it relates to a two piece golf ball having excellent hit feeling.

BACKGROUND OF THE INVENTION

A two piece golf ball has been widely used because of its high flying performance. However, hit feeling of the two piece golf ball is hard in comparison with a conventional thread wound golf ball and it gives harder feeling on a misshot and, therefore, specific users, particularly, women or elderly persons, are liable to avoid the two piece golf ball.

In order to obtain hit feeling similar to that of the thread wound golf ball, various efforts have been made. For example, hit feeling is improved by softening either the cover or the core of the golf ball. However, according to these methods, hit feeling of the resulting golf ball is soft but feels heavy and, therefore, it is not necessarily similar to that of the thread wound golf ball.

SUMMARY OF THE INVENTION

Under these circumstances, the present inventors have intensively studied hit feeling. First, when hardness of the core of the golf ball is softened, hit feeling becomes soft. The impact resilience of the ball, however, deteriorates because of a lack of total stiffness, which results in poor hit feeling. Further, when the cover is softened, impact resilience is lowered and, therefore, the impact resilience of the ball becomes inferior. Users feel hardness of the core more markedly when the cover is soft, which results in hard and heavy hit feeling. Accordingly, it has been found that excellent hit feeling can be obtained while avoiding the drawbacks of the soft core with the improvement of the properties of the cover.

The main object of the invention is to provide a golf ball having hit feeling similar to that of a thread wound golf ball, by controlling the properties of both the core and the cover of the two piece golf ball.

This object as well as other objects and advantages of the present invention will become apparent to those skilled in the art from the following description.

According to the present invention, there is provided a two piece golf ball comprising a core and a cover, wherein the core has a deformation (compression deformation) of 3.7 to 4.5 mm caused by applying from 10 kg of an initial load to 130 kg of a final load. The core is prepared from a rubber composition comprising 100 parts by weight of a cis-1,4-polybutadiene rubber and 20 to 30% by weight of a metal salt of an unsaturated carboxylic acid, and the cover has a stiffness modulus of 3,700 to 4,500 kg/cm$^2$ and a thickness of 2.2 to 2.9 mm.

DETAILED DESCRIPTION OF THE INVENTION

The core of the two piece golf ball of the present invention is formed from a rubber composition comprising 100 parts by weight of a so-called high cis-polybutadiene rubber having a cis-1,4 structure of at least 40%, and preferably not less than 80%, and 20 to 30% by weight of a metal salt of an unsaturated carboxylic acid. The metal salt of the unsaturated carboxylic acid is generally formulated as a co-crosslinking agent, and one or more metal salts may be selected from metal salts of acrylic acid (e.g. zinc acrylate, magnesium acrylate, etc.), metal salts of methacrylic acid (e.g. zinc methacrylate, magnesium methacrylate, etc.), and the like. The amount of the metal salt of the unsaturated carboxylic acid (20 to 30% by weight) based on 100 parts by weight of the rubber is small in comparison with the amounts used in conventional formulations. By using such a small amount, excellent hit feeling is obtained.

As a matter of course, the rubber composition may contain ingredients which are normally contained in a rubber composition for the core of the golf ball, in addition to the metal salt of the unsaturated carboxylic acid. Examples of additional ingredients include organic peroxides as crosslinking agents, fillers, antioxidants, stabilizers, and the like. Examples of organic peroxides include dicumyl peroxide, 1,1-bis(t-butylperoxy)-3,5-trimethylcyclohexane, 2,5-dimethyl-2,5-di(t-butylperoxy)hexane, di-t-butyl peroxide, and the like. Dicumyl peroxide is particularly preferred. The amount of the organic peroxide is 0.3 to 3.0 parts by weight, preferably 1.0 to 2.5 parts by weight based on 100 parts by weight of the base rubber. Examples of the fillers include zinc oxide, barium sulfate, calcium carbonate, water-containing acid salt, and the like.

The above rubber composition is sufficiently kneaded and then vulcanized and formed in a mold to form a core for a two piece golf ball. The kneading and vulcanizing conditions are known in the art, and vulcanization is normally conducted at a temperature of 140° to 180° C. for 15 to 55 minutes.

It is necessary that the the core of the golf ball of the present invention has a compression deformation (deformation caused by applying from 10 kg of an initial load to 130 kg of a final load) of 3.7 to 4.5 mm. The compression deformation can be controlled by controlling the amount of the metal salt of the unsaturated carboxylic acid and it can also be controlled by controlling the other vulcanization conditions. Even compression deformation is controlled by any of these methods, the rebound coefficient decreases and flying performance deteriorates when deformation of the core is too large. In effect, the ball becomes too soft, which results in heavy and poor hit feeling. On the other hand, when the deformation is smaller than 3.7 mm, the maximum impact force is large and, therefore, hit feeling is hard.

It is preferred that the hardness (JIS-C) of the core satisfy the following conditions:

Center: 56 to 58

5 to 10 mm away from the center: 68 to 73 (deviation ±3)

15 mm away from the center: 74 to 80

Surface: 75 to 83.

The technique wherein hardness distribution is specified is described in Japanese Patent Kokai No. 60-90575.

The core of the golf ball thus obtained is covered with a cover (normally, made of an ionomer resin) to obtain a two piece golf ball. It is necessary that the cover of the two piece golf ball of the present invention have a stiffness modulus of 3700 to 4500 kg/cm$^2$, and a thickness of 2.2 to 2.9 mm. When the stiffness modulus is less than 3700 kg/cm$^2$, the modulus of the cover is low and the impact resilience is slightly lowered, which results in a deterioration of flying performance. In this case, both the cover and the core become soft, which results in heavy and poor hit feeling. On the other hand, when the stifness modulus exceeds 4500 kg/cm$^2$, spinning in flight is lowered, and the ball is slightly dropped, and therefore flying performance is inferior. Further, the impact force becomes high, which results in hard feeling. When the thickness of the cover is less than 2.2 mm, the stiffness modulus of the cover has no effect, and the hit feeling is influenced only by the core. On the other hand, when the thickness exceeds 2.9 mm, the hit feeling does not reflect the properties of the core and the desired effect of the present invention is not obtained.

A cover having the above properties can be obtained by mixing various ionomer resins. Examples of suitable ionomer resin include HI-MILAN 1706, 1605 available from Mitsui Polychemicals Co.; ESCOR EX 951, 562, 900 available from EXXON Co., and the like.

Methods for covering a core with an ionomer resin are known. Generally, the core is covered by injection molding.

The two piece golf ball thus obtained has excellent hit feeling. Hit feeling is the feeling a person gets when they hit the golf ball, and is difficult to indicate with a numerical value. However, it is possible to correlate hit feeling with maximum impact index, contact area, contact time and the like. These values have been measured, vary depending upon the kind of club used, other test conditions and the like. For example, if each numerical value of the maximum impact force, contact time, contact area and maximum deformation rate of Example 1 is made 100, hit feeling should be excellent when each property satisfies the conditions of 100±3, 100±3, 100±4, 100±4, respectively.

The two piece golf ball of the present invention has a hit feeling which is similar to that of a conventional thread wound golf ball but with the performance of a two piece golf ball per se. The two piece golf ball is thus superior in both flying performance and hit feeling.

The following Examples further illustrate the present invention in detail, but are not to be construed to limit the scope thereof.

EXAMPLES 1 TO 6 AND COMPARATIVE EXAMPLES 1 to 6

Formulation ingredients for the core shown in Table 1 were kneaded to obtain a rubber composition. The rubber composition was vulcanized and formed in a mold at 165° C. for 25 minutes. The hardness distribution and compression hardness of the resulting core are shown in Table 1.

The obtained core was covered with a cover resin, which was prepared from the formulation ingredients for the cover resin shown in Table 1. The stiffness modulus and cover thickness are shown in Table 1.

Hardness (measured by PGA system), durability index, maximum impact force, contact area, contact time, maximum deformation rate, restitution coefficient, launch angle, spin performance, flying distance (carry), and hit feeling of the resulting large size two piece golf ball are shown in Table 2. Further, evaluation of hit feeling was conducted by the following criteria:

A: good, having good hit feeling
B fairly good, having too soft or slightly hard hit feeling
C: bad, having too hard of a hit feeling.

TABLE 1

|  | Example | | | | | |
|---|---|---|---|---|---|---|
|  | 1 | 2 | 3 | 4 | 5 | 6 |
| (Core) | | | | | | |
| Formulation | | | | | | |
| BR-01 | 100 | 100 | 100 | 100 | 100 | 100 |
| Zinc acrylate | 22 | 25 | 28 | 22 | 25 | 28 |
| Zinc white | 24 | 22.5 | 21.5 | 27 | 25.8 | 25 |
| Antioxidant | 0.5 | 0.5 | 0.5 | 0.5 | 0.5 | 0.5 |
| Dicumyl peroxide | 2.0 | 1.8 | 1.0 | 1.6 | 1.3 | 0.8 |
| Hardness distribution | | | | | | |
| Center | 60 | 60 | 63 | 64 | 63 | 63 |
| 5 mm away from center | 70 | 71 | 72 | 72 | 71 | 70 |
| 10 mm away from center | 70 | 71 | 72 | 72 | 71 | 71 |
| 15 mm away from center | 75 | 76 | 77 | 76 | 75 | 74 |
| Surface | 79 | 78 | 78 | 78 | 77 | 77 |
| Compression hardness (mm) | 3.93 | 3.93 | 3.92 | 4.35 | 4.35 | 4.36 |
| (Cover) | | | | | | |
| Formulation[6] | | | | | | |
| HI-MILAN 1706 | — | — | — | — | — | — |
| HI-MILAN 1605 | — | — | — | — | — | — |
| EMAA-Na* | — | — | — | — | — | 50 |
| EMAA-Li** | — | — | — | — | — | — |
| ESCOR EX951 | 40 | 50 | 60 | 25 | 25 | 50 |
| ESCOR EX562 | — | — | — | 25 | 25 | — |
| ESCOR EX900 | 60 | 50 | 40 | 50 | 50 | — |
| Stiffness modulus (23° C., 2 weeks) | 3820 | 3880 | 3910 | 3930 | 3930 | 4250 |
| Cover thickness[5] (mm) | 2.4 | 2.4 | 2.4 | 2.8 | 2.8 | 2.8 |

|  | Comparative Example | | | | | |
|---|---|---|---|---|---|---|
|  | 1 | 2 | 3 | 4 | 5 | 6 |
| (Core) | | | | | | |
| Formulation | | | | | | |
| BR-01 | 100 | 100 | 100 | 100 | 100 | 100 |
| Zinc acrylate | 32 | 18 | 22 | 22 | 28 | 28 |
| Zinc white | 20.5 | 25.5 | 24 | 24 | 19 | 27 |
| Antioxidant | 0.5 | 0.5 | 0.5 | 0.5 | 0.5 | 0.5 |
| Dicumyl peroxide | 1.5 | 2.8 | 2.0 | 2.0 | 1.0 | 0.6 |
| Hardness distribution | | | | | | |

TABLE 1-continued

| | | | | | | |
|---|---|---|---|---|---|---|
| Center | 6.1 | 55 | 60 | 60 | 64 | 65 |
| 5 mm away from center | 74 | 70 | 70 | 70 | 72 | 71 |
| 10 mm away from center | 74 | 70 | 70 | 70 | 72 | 71 |
| 15 mm away from center | 78 | 75 | 75 | 75 | 75 | 75 |
| Surface | 81 | 78 | 79 | 79 | 77 | 76 |
| Compression hardness (mm) | 3.20 | 4.70 | 3.93 | 3.93 | 3.91 | 4.35 |
| (Cover) | | | | | | |
| Formulation[6] | | | | | | |
| HI-MILAN 1706 | — | — | 50 | — | — | — |
| HI-MILAN 1605 | — | — | 50 | — | — | — |
| EMAA-Na* | — | — | — | — | — | — |
| EMAA-Li** | — | — | — | 50 | — | — |
| ESCOR EX951 | 40 | 40 | — | — | 60 | 60 |
| ESCOR EX562 | — | — | — | — | — | — |
| ESCOR EX900 | 60 | 60 | — | 50 | 40 | 40 |
| Stiffness modulus (23° C., 2 weeks) | 3820 | 3820 | 3300 | 4650 | 3910 | 3910 |
| Cover thickness[5] (mm) | 2.4 | 2.4 | 2.4 | 2.4 | 2.0 | 3.2 |

| Note: | Neutralization metal | Acid content (wt %) | Neutralization degree (mole %) | Stiffness modulus | |
|---|---|---|---|---|---|
| * | Na | 20 | 55 | 4500 | (ethylene-methacrylic acid copolymer) |
| ** | Li | 20 | 60 | 4700 | (ethylene-methacrylic acid copolymer) |

TABLE 2

| | Example | | | | | |
|---|---|---|---|---|---|---|
| | 1 | 2 | 3 | 4 | 5 | 6 |
| (Evaluation of ball) | | | | | | |
| Hardness | 88 | 88 | 89 | 90 | 91 | 92 |
| Durability index[1] | 100 | 103 | 105 | 102 | 105 | 108 |
| Maximum impact force index[2] | 100 | 101 | 102 | 101 | 101 | 102 |
| Contact surface index[3] | 100 | 100 | 99 | 100 | 99 | 98 |
| Contact time index[3] | 100 | 100 | 99 | 99 | 98 | 97 |
| Maximum deformation rate index[3] | 100 | 100 | 99 | 99 | 98 | 97 |
| Rebound coefficient (45 m/second) | 0.7800 | 0.7800 | 0.7801 | 0.7798 | 0.7802 | 0.7807 |
| Flying performance[4] | | | | | | |
| Launch angle (°) | 11.1 | 11.1 | 11.1 | 11.2 | 11.2 | 11.3 |
| Spin (rpm) | 2500 | 2480 | 2470 | 2450 | 2440 | 2420 |
| Carry (yard) | 235 | 235 | 235 | 235.5 | 235.5 | 236 |
| Evaluation of feeling | A | A | A | A | A | A |

| | Comparative Example | | | | | |
|---|---|---|---|---|---|---|
| | 1 | 2 | 3 | 4 | 5 | 6 |
| (Evaluation of ball) | | | | | | |
| Hardness | 104 | 78 | 85 | 96 | 88 | 90 |
| Durability index[1] | 140 | 70 | 104 | 92 | 100 | 110 |
| Maximum impact force index[2] | 110 | 95 | 95 | 107 | 102 | 106 |
| Contact surface index[3] | 91 | 105 | 105 | 94 | 99 | 93 |
| Contact time index[3] | 88 | 106 | 103 | 92 | 99 | 91 |
| Maximum deformation rate index[3] | 92 | 105 | 104 | 95 | 99 | 94 |
| Rebound coefficient (45 m/second) | 0.7795 | 0.7740 | 0.7755 | 0.7808 | 0.7775 | 0.7760 |
| Flying performance[4] | | | | | | |
| Launch angle (°) | 10.7 | 11.1 | 10.9 | 11.4 | 10.9 | 11.2 |
| Spin (rpm) | 2650 | 2480 | 2600 | 2300 | 2610 | 2430 |
| Carry (yard) | 233.5 | 232 | 233 | 233 | 234 | 233 |
| Evaluation of feeling | | | | | | |

TABLE 2-continued

| | C | B-C | C | C | B-C | B-C |
|---|---|---|---|---|---|---|

[1] Durability index: By using a swing-robot manufactured by True Temper Co., a golf ball is hit at a speed of 45 m/second and the number of times at which the ball is broken is determined. The number is expressed as an index when the number of Example 1 is made 100.
[2] Maximum impact force index: By using a swing-robot, a golf ball is hit at a club-head speed of 40 m/second with a No. 1 wood golf club of which rear part is provided with an accelerometer to determine the maximum impact force. The number is expressed as an index when the number of Example 1 (1150 kg weight) is made 100.
[3] Contact area index, contact time and maximum deformation rate index: By using a swing-robot, a golf ball is hit at a club-speed of 40 m/second with a No. 1 wood golf club to determine contact area index, contact time and maximum deformation rate index. Each number is expressed as an index when each number of Example 1 (4.35 cm$^2$, 515 μm, 20%, respectively) is made 100.
[4] Flying performance: By using a swing-robot, a golf ball is hit at a club-head speed of 45 m/second with driver to determine a flying performance.
[5] Cover thickness (measured by a stiffness tester manufactured by Toyo Seiki Co.) A sample plate is made by press forming and then tested after standing at 23° C. and 50% (humidity) for two weeks.
[6] Titanium oxide (TiO$_2$) is added in an amount of 2 parts by weight based on 100 parts by weight of an ionomer resin, followed by coloring with an extruder to prepare a cover composition.

What is claimed is:

1. A two piece golf ball comprising a core and a cover, wherein the core has a compression deformation of 3.7 to 4.5 mm caused by applying from 10 kg of an initial load to 130 kg of a final load, wherein the core is prepared from a rubber composition comprising 100 parts by weight of a cis-1,4-polybutadiene rubber and 20 to 30% by weight of a Group IIA or IIB metal salt of (meth)acrylic acid, and wherein the cover has a stiffness modulus of 3,700 to 4,500 kg/cm$^2$ and a thickness of 2.2 to 2.9 mm.

2. The golf ball according to claim 1 wherein said core is formed from a rubber composition comprising 100 parts by weight of a high cispolybutadiene rubber having a cis-1,4 structure of at least 40% and 20 to 30% by weight of a Group IIA or IIB metal salt of (meth)acrylic acid.

3. The golf ball according to claim 2 wherein said rubber composition further comprises organic peroxides or fillers.

4. The golf ball according to claim 1 wherein the hardness (JIS-C) of the core satisfies the following conditions:

Center: 56 to 58
5 to 10 mm away from the center: 68 to 73 (deviation ±3%)
15 mm away from the center: 74 to 80
Surface: 75 to 83.

* * * * *